Aug. 23, 1966  J. W. DUCHARME  3,268,189
MOUNTING DEVICE
Filed Oct. 27, 1964
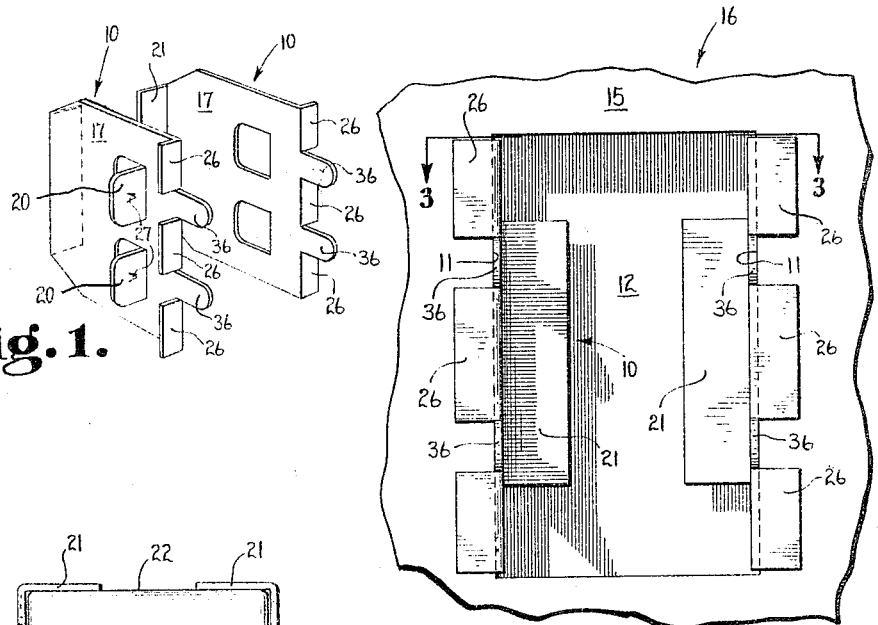
Fig. 1.
Fig. 2.
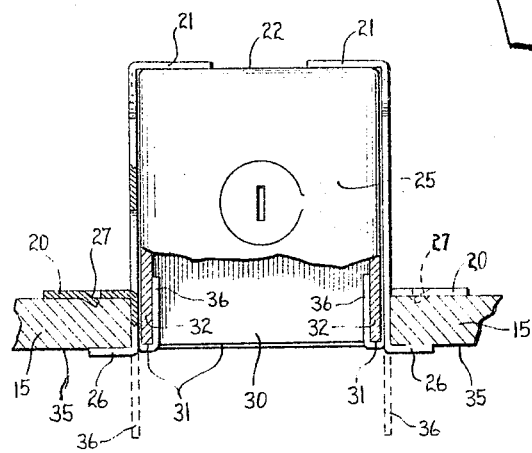
Fig. 3.
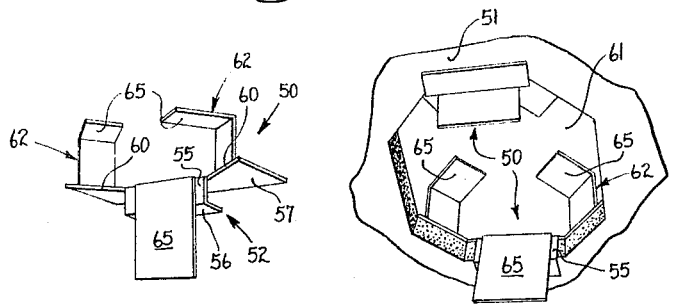
Fig. 4.
Fig. 5.
INVENTOR.
JEROME W. DUCHARME
BY
Lockwood, Woodard, Smith & Weikart
Attorneys

United States Patent Office 3,268,189
Patented August 23, 1966

3,268,189
MOUNTING DEVICE
Jerome W. Ducharme, Rte. 1, Plainville, Ind.
Filed Oct. 27, 1964, Ser. No. 406,701
7 Claims. (Cl. 248—27)

The present invention relates to means for mounting electrical receptacles or connection boxes.

It is particularly desirable that fast efficient means be provided for mounting electrical receptacles in walls, ceilings and the like during building construction. There are presently available a number of different types of devices for mounting electrical junction boxes or the like. These commercial devices, however, have not proved completely satisfactory for various reasons. Consequently, it is a primary object of the present invention to provide improved means for mounting electrical receptacles or the like in building construction.

Another object of the invention is to provide a mounting device which is simple and economical in its parts and which may be easily and quickly manipulated by an unskilled workman.

A further object of the invention is to provide a mounting device for mounting electrical receptacles in such a manner that no nails, screws or like means are required for securing the receptacle to the wall, it being understood that such means frequently damage plaster and the like.

Still another object of the invention is to provide a mounting device which is relatively inexpensive to manufacture yet is durable and capable of carrying out its intended purpose as long as necessary, that is, during building and for the life of the building construction.

Related objects and advantages will become apparent as the description proceeds.

One embodiment of the present invention might include a receptacle mounting comprising, in combination, a building wall having an aperture of rectilinear outline; a pair of fastening elements each including a channel shape gripping an edge of the wall at said aperture, a bendable member extending forwardly from the channel shape out of said aperture, and a receptacle support element projecting from said channel shape rearwardly and then inwardly toward the axis of said aperture to provide a flange adapted to support the rearward portion of the receptacle, said bendable member being bendable into said receptacle to mount the receptacle in the wall aperture.

The full nature of the invention will be understood from the accompanying drawings and the following description and claims.

FIG. 1 is a perspective view of a pair of fastening elements embodying the present invention.

FIG. 2 is a front elevation of a building wall having the fastening elements of FIG. 1 mounted thereon in readiness for mounting an electric receptacle or the like.

FIG. 3 is a horizontal section taken along the line 3—3 of FIG. 2 in the direction of the arrows.

FIG. 4 is a perspective view of a further fastening element embodying the present invention.

FIG. 5 is a perspective view similar to FIG. 2 in showing the fastening element of FIG. 4 in readiness for mounting of an electric receptacle.

For the purposes of promoting an understanding of the principles of the invention, reference will now be made to the embodiments illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated an identical pair of fastening elements 10 which are shown in FIG. 2 as mounted on the opposite sides 11 of a rectangular aperture 12 formed through the plaster board 15 or the like of building construction 16. Each fastening element 10 is formed of sheet material and includes a flat central portion 17 from which is cut and pressed out perpendicular projections 20.

Formed integrally with the central portion 17 is an inwardly bent end portion 21 which receives the rearward portion 22 of the receptacle 25 in the manner shown in FIG. 3. Each of the fastening elements 10 also includes three aligned tabs 26 which are bent outwardly and are in parallel relation to the projections 20.

It can be appreciated that the tabs 26 and the projections 20 define what might generally be referred to as a channel shape. The manufacturer of the present device can provide this channel shape with the projections 20 and the tabs 26 spaced at various distances so that the fastening elements 10 can be used with walls of different thicknesses.

Each of the projections 20 is provided with an inwardly punched portion 27 which operates to lock the fastening element 10 on the plaster board 15, after the fastening element 10 has been pushed onto the plaster board to the position illustrated in FIG. 2. After the fastening elements have been placed in the position of FIG. 2, the aperture 12 and the fastening elements are ready to receive the receptacle 25. The distance between the inwardly turned flange or end portions 21 and the tabs 26 is equal to the depth of the receptacle 25. Consequently, when the receptacle has been fully inserted into the aperture 12, as in FIG. 3, the open face 30 of the receptacle as defined by the edges 31 of the side walls 32 will be aligned with the forward face 35 of the plaster board 15. The manufacturer of the present device can also vary the distance between end portions 21 and the tabs 26 to provide for receptacles of varying depth.

Formed integrally with the central portion 17 of the fastening elements 10 are bendable portions 36. The bendable portions 36 also function to space the tabs 26. When the receptacle 25 is in the position of FIG. 3, the bendable portions 36 are pushed down by the thumbs over the edges 31 and inside of the receptacle 25 to secure it in place. The receptacle is then firmly mounted and is ready for subsequent electrical wiring.

Referring to FIGS. 4 and 5, there is illustrated a fastening element 50 which is particularly adapted for mounting an electric receptacle in the ceiling 51. The fastening element 50 includes a channel shaped member 52 which has a web 55 and a pair of legs 56 and 57. The leg 57 is cut at 60 to taper or extend diagonally relative to the web 55. The shape of the leg 57 adjacent to the web 55 and the surfaces 60 conforms to the shape of the aperture 61 which has eight sides. Of course, the electrical receptacle which is mounted in the aperture 61 is of similar size and contour to the aperture 61 and also has eight sides.

Fixed to the rearward face of the leg 57 are a pair of angles 62 which have inturned flanges 65 adapted to back up the electric receptacle and to prevent its being pushed through the aperture 61 at the time of mounting the receptacle. Secured to the web 55 by welding or the like is a flat member 65 of bendable material which is bent into the receptacle after it has been properly located in the aperture 61 in similar fashion to the above described device of FIGS. 1–3. As suggested in FIG. 5, a pair of the fastening elements 50 are used to mount a single receptacle.

It will be obvious from the above description that the present invention provides a mounting device which is simple and economical in its parts and which may be easily and quickly manipulated by an unskilled workman. It will also be clear from the above description that the mounting device of the present invention eliminates the necessity of using nails, screws and the like and, consequently, eliminates the cost of damage to plaster and the like.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected. For example, the inturned end portions 21 can be scored at a plurality of locations to permit bending on the job to accommodate various depths of receptacles. Similarly the projections 20 can be scored to permit bending thereof to a position closer to or farther away from the tabs 26 to accommodate various wall thicknesses.

The invention claimed is:

1. A sheet material receptacle mounting, comprising a channel shape adapted to grip an edge of a wall aperture, said channel shape including a flat web and flat legs extending perpendicularly from said web, a bendable member secured to and extending forwardly from the channel shape, and a receptacle support element aligned with said web and projecting from said channel shape rearwardly and then perpendicularly away from the legs of said channel shape and providing a flat flange adapted to support the outside of the rearward portion of a receptacle, said bendable member being bendable into said receptacle to mount the receptacle, said channel shape being sufficiently short to be projected through the wall aperture from the forward side thereof for securing the channel shape to the edge of the wall.

2. A sheet material receptacle mounting comprising a channel shape adapted to grip an edge of a wall aperture, said channel shape including a flat web and flat legs extending perpendicularly from said web, a bendable member secured to and extending generally in alignment with the web of the channel shape, and a receptacle support element aligned with said web and projecting from said channel shape oppositely of said bendable member and then perpendicularly away from the legs of said channel shape and providing a flat flange adapted to support the outside of the rearward portion of a receptacle, said bendable member being bendable into said receptacle to mount the receptacle, said channel shape being sufficiently short to be projected through the wall aperture from the forward side thereof for securing the channel shape to the edge of the wall.

3. A sheet material receptacle mounting, comprising, in combination, a building wall having an aperture of rectilinear outline; a pair of fastening elements each including a channel shape gripping an edge of the wall at said aperture, each of said channel shapes including a flat web and flat legs extending perpendicularly from said web, a pair of bendable members each extending forwardly from a respective channel shape out of said aperture, and a receptacle support element aligned with said web and projecting from said channel shape rearwardly and then inwardly toward the axis of said aperture and providing a flat flange adapted to support the outside of the rearward portion of the receptacle, said bendable member being bendable into said receptacle to mount the receptacle in the wall aperture, said channel shape being sufficiently short to be projected through the wall aperture from the forward side thereof for securing the channel shape to the edge of the wall.

4. A sheet material receptacle mounting, comprising, in combination, a building wall having an eight sided opening therethrough, a receptacle with side walls and of similar size and contour adapted to be mounted in said wall aperture, said receptacle having an open face defined by the edges of the side walls of said receptacle, a pair of fastening elements each including a channel shape receiving the building wall at its edge to mount the fastening elements on the wall, said channel shape extending around three of the eight sides of the opening, a bendable member secured to said channel shape and projecting forwardly out of the opening and parallel to the web of said channel shape, and a pair of angles secured to the rearward leg of said channel shape and having inturned flanges to receive and support the rearward portion of the receptacle, said fastening elements being sufficiently short to be projected through the wall opening from the forward side thereof for securing the channel shapes to the wall.

5. A sheet material receptacle mounting comprising, in combination, a building wall having an eight sided opening therethrough, a receptacle with side walls and of similar size and contour adapted to be mounted in said wall aperture, said receptacle having an open face defined by the edges of the side walls of said receptacle, a pair of fastening elements each including a channel shape receiving the building wall at its edge to mount the fastening elements on the wall, said channel shape extending around three of the eight sides of the opening, a bendable member secured to said channel shape and projecting forwardly out of the opening and parallel to the web of said channel shape, a pair of angles secured to the rearward leg of said channel shape and having inturned flanges to receive and support the rearward portion of the receptacle, said inturned flanges being spaced from said tabs a distance equal to the depth of said receptacle whereby said bendable projections can be bent into said receptacle to mount it on the wall, said fastening elements being sufficiently short to be projected through the wall opening from the forward side thereof for securing the channel shapes to the wall.

6. A sheet material receptacle mounting comprising, in combination, a building wall having an aperture of rectilinear outline, a receptacle with side walls and of similar size and contour adapted to be mounted in said wall aperture, said receptacle having an open face defined by the edges of the side walls of said receptacle, a pair of fastening elements each comprising a central portion with a pair of projections pressed outwardly therefrom and extending perpendicularly of said central portion, said fastening elements each further including an inwardly bent end portion at one end thereof adapted to receive and engage the outside of the rearward portion of the receptacle to support the receptacle against being forced through the wall aperture, said fastening elements each also including three aligned tabs bent outwardly and in parallel relation to said projections and a pair of bendable portions extending coextensively with said central portion and spacing said three tabs, said receptacle mounting being sufficiently short to be projected through the wall aperture from the forward side thereof for securing the mounting to the wall with the wall between the tabs and projections.

7. A sheet material receptacle mounting comprising, in combination, a building wall having an aperture of rectilinear outline, a receptacle with side walls and of similar size and contour adapted to be mounted in said wall aperture, said receptacle having an open face defined by the edges of the side walls of said receptacle, a pair of fastening elements each comprising a central portion with a pair of projections pressed outwardly therefrom and extending perpendicularly of said central portion, said fastening elements each further including an inwardly bent end portion at one end thereof adapted to receive and engage the outside of the rearward portion of the receptacle to support the receptacle against being forced through the wall aperture, said fastening elements each also including three aligned tabs bent outwardly and in parallel relation to said projections and a pair of bendable portions extending coextensively with said central portion and spacing said three tabs, said projections and tabs defining with said central portion a channel shape adapted to receive the building wall, said channel shape being sufficiently short to be projected through the wall aperture from the forward side thereof for securing the channel shape to the edge of the wall, said projections each having inwardly punched pointed elements projecting toward the respective channel webs and locking said fastening elements in place, said fastening elements being mounted on opposite sides of said aperture, said inwardly bent portions being spaced from said tabs a distance equal to the depth of said receptacle whereby said bendable projections can be bent into said receptacle to mount it on the wall.

References Cited by the Examiner

UNITED STATES PATENTS

| | | | |
|---|---|---|---|
| 2,429,443 | 10/1947 | Yeschick | 248—27 |
| 2,670,915 | 3/1954 | Clark | 248—27 |
| 2,684,220 | 7/1954 | Beber et al. | 248—27 |
| 2,751,173 | 6/1956 | Fredriksen | 248—27 |
| 2,930,505 | 3/1960 | Meyer | 220—18 |

CLAUDE A. LE ROY, *Primary Examiner.*

J. F. FOSS, *Assistant Examiner.*